A. R. BEHNKE.
DEMOUNTABLE RIM.
APPLICATION FILED SEPT. 23, 1909.
981,740.
Patented Jan. 17, 1911.
2 SHEETS—SHEET 1.
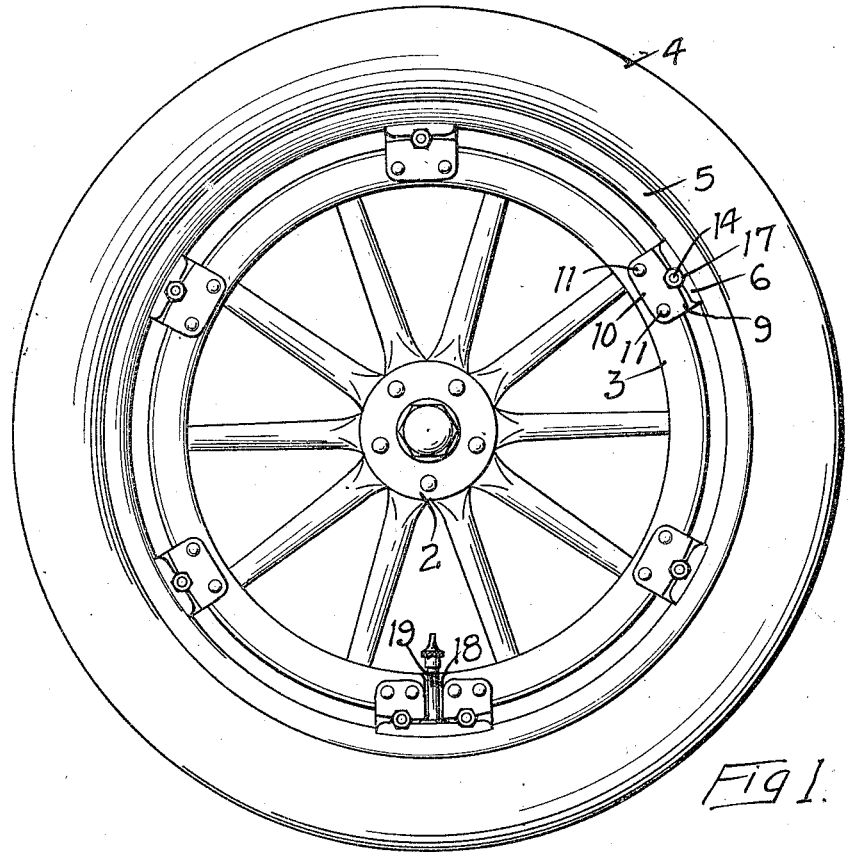
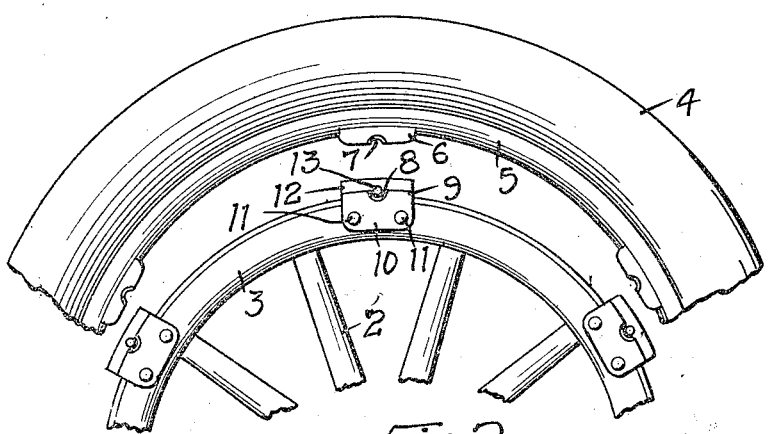
WITNESSES
INVENTOR
ALBERT R. BEHNKE
BY Paul & Paul
ATTORNEYS A. R. BEHNKE.
DEMOUNTABLE RIM.
APPLICATION FILED SEPT. 23, 1909.
981,740.
Patented Jan. 17, 1911.
2 SHEETS—SHEET 2.
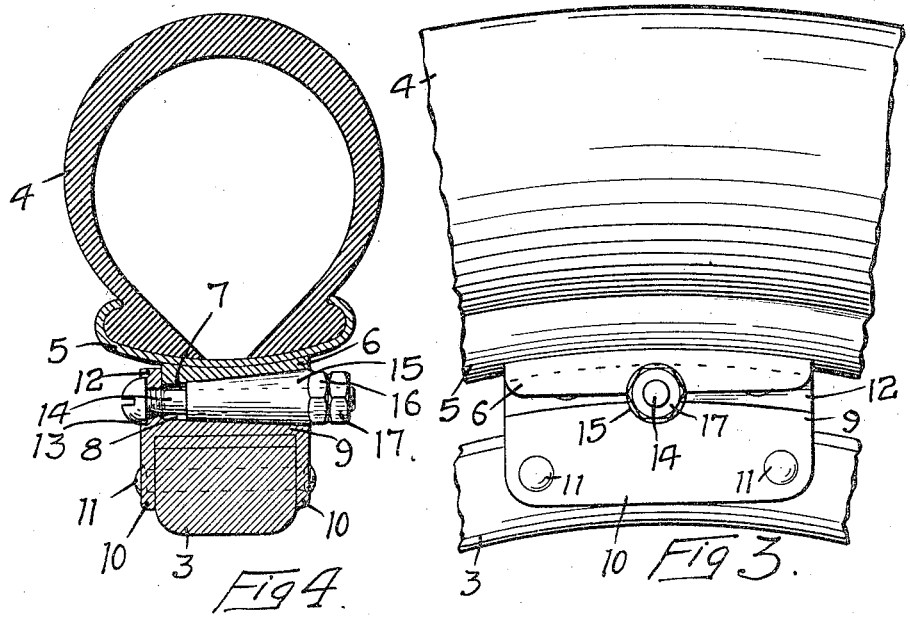
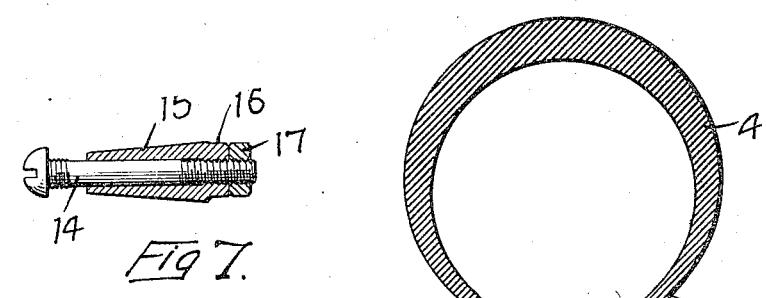
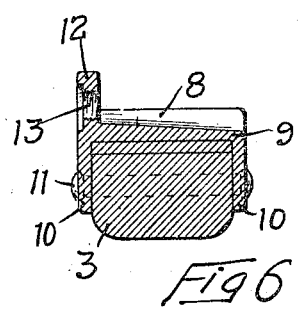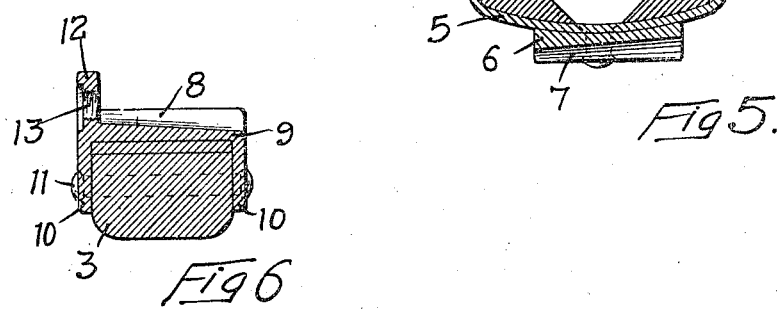
WITNESSES
INVENTOR
ALBERT R. BEHNKE
ATTORNEYS

UNITED STATES PATENT OFFICE.

ALBERT R. BEHNKE, OF ST. PAUL, MINNESOTA.

DEMOUNTABLE RIM.

981,740.  Specification of Letters Patent.  Patented Jan. 17, 1911.

Application filed September 23, 1909. Serial No. 519,264.

*To all whom it may concern:*

Be it known that I, ALBERT R. BEHNKE, of St. Paul, Ramsey county, Minnesota, have invented certain new and useful Improvements in Demountable Rims, of which the following is a specification.

My invention relates to pneumatic tires and wheels therefor and the object of the invention is to provide means whereby a tire and rim can be easily and quickly mounted on the wheel and as readily removed therefrom.

A further object is to provide means which will securely clamp or lock a tire or rim in position on the wheel felly.

My invention consists generally in various constructions and combinations, all as hereinafter described and pointed out in the claims.

In the accompanying drawings forming a part of this specification, Figure 1 is a side elevation of a wheel with my invention applied thereon, Fig. 2 is a partial elevation of a wheel and tire showing the parts in their separated position, Fig. 3 is a detail view illustrating the clamping or locking mechanism, Fig. 4 is a sectional view of the same, Fig. 5 is a transverse sectional view through the tire casing and rim and one member of the locking device, Fig. 6 is a detail sectional view of the wheel felly and the other locking members, Fig. 7 is a detail sectional view of the locking wedge.

In the drawing, 2 represents an automobile wheel having a felly 3.

4 is the outer casing of a clencher type of tire having a rim 5 interlocking with the edges of the casing in the usual way. Between the felly and the rim, at intervals around the wheel, I provide locking devices. I have shown six of these devices on the wheel in Fig. 1, but a greater or less number may be employed according to the diameter of the wheel and the dimensions of the tire. The locking devices are all alike except that one of them is made double to adapt it for its location on both sides of the valve stem. A description, therefore, of one of the locking devices will suffice for all. Each locking device consists of a block member 6 secured to the rim 5 and having a tapered groove 7 therein arranged and coöperating with a similar groove 8 provided in the other member 9 which is secured to the felly 3 by means of lugs 10 and rivets 11. One end of the block 9 has a flange 12 thereon provided with a socket 13 to receive the threaded portion of a bolt 14 and a tapered sleeve 15 is arranged to slip over the bolt 14 and into the tapered socket formed between the blocks 6 and 9 when placed one over the other and opposite one another.

The sleeve has an end 16 adapted to receive a wrench and is interiorly threaded at one end to engage the threaded end of the bolt and a locking nut 17 is provided on the end of the bolt to prevent premature movement of the locking sleeve. When the parts are assembled and the tapered sleeves are inserted into the sockets, a wrench may be applied thereto until the sleeves are wedged firmly in the sockets and the tire and rim are firmly locked on the felly. Upon loosening the sleeves of two or more of the locking devices the rim and tire are rendered readily removable.

The degree of tension on the tire rim can be easily and quickly controlled by means of the locking sleeves, each one of which can be adjusted accurately and easily to take up any looseness of the parts and at the same time allow the rim to be accurately centered on the wheel. It sometimes happens that the tire rim rusts on the felly to such an extent that removal is difficult, but with my invention all objectionable features of this kind are eliminated and the removal or replacing of the tire and rim is easily performed.

As heretofore stated, the locking device is duplicated at one point on the wheel and provided with a recess 18 into which the valve stem 19 of the tire is inserted. In other respects this locking member is the same as the others around the wheel.

I claim as my invention:

1. The combination, with a wheel felly, of a tire and rim inclosing the same, a series of blocks carried by said felly, flanges carried by said rim, the opposing surfaces of said blocks and rim having tapered grooves extending transversely of said rim, bolts passing through said flanges and lengthwise through said sockets, tapered sleeves carried by said bolts and in threaded connection therewith and having outer ends adapted to receive a wrench.

2. The combination, with a felly, of a tire and rim inclosing the same and spaced therefrom, locking devices provided at intervals around the periphery of said felly and between it and said rim, said locking devices including a series of blocks having transverse tapered sockets therein extending transversely of said wheel felly and bolts passing through said sockets and having locknuts thereon and sleeves tapered from end to end and carried by said bolts and fitting within said sockets and in threaded engagement with said bolts and adapted to be rotated thereon to lock or release said rim.

3. The combination, with a wheel felly, of a tire and rim inclosing the same, a series of blocks mounted at intervals on said rim and having tapered grooves therein, a series of blocks carried by said felly and also having tapered grooves coöperating with those in said rim blocks to form a series of tapered sockets extending transversely of the wheel felly, said felly blocks having flanges thereon with which the blocks on said rim contact, bolts passing through said flanges and lengthwise through said sockets, tapered sleeves carried by said bolts and in threaded engagement therewith and having outer ends adapted to receive a wrench, substantially as described.

In witness whereof, I have hereunto set my hand this 21st day of September 1909.

ALBERT R. BEHNKE.

Witnesses:
RICHARD PAUL,
J. A. BYINGTON.